(12) United States Patent
Beranger

(10) Patent No.: US 8,552,610 B2
(45) Date of Patent: Oct. 8, 2013

(54) ALTERNATOR AND CORRESPONDING ELECTRIC SYSTEM

(75) Inventor: Marc Beranger, Biviers (FR)

(73) Assignee: Commissariat a l'Energie Atomique et aux Energies Alternatives, Paris (FR)

( * ) Notice: Subject to any disclaimer, the term of this patent is extended or adjusted under 35 U.S.C. 154(b) by 277 days.

(21) Appl. No.: 12/962,116

(22) Filed: Dec. 7, 2010

(65) Prior Publication Data

US 2011/0140563 A1 Jun. 16, 2011

(30) Foreign Application Priority Data

Dec. 8, 2009 (FR) ...................................... 09 58732

(51) Int. Cl.
*H02K 3/47* (2006.01)
(52) U.S. Cl.
USPC ............ 310/195; 310/198; 310/208; 310/179
(58) Field of Classification Search
USPC ............... 310/195, 216.1–216.137, 179, 180, 310/198, 208
See application file for complete search history.

(56) References Cited

U.S. PATENT DOCUMENTS

| 6,975,050 B2 * | 12/2005 | Cleanthous et al. ............ 310/50 |
| 2001/0043806 A1 | 11/2001 | Gorti et al. |
| 2003/0042803 A1 * | 3/2003 | Hirschburger et al. ......... 310/47 |

FOREIGN PATENT DOCUMENTS

| EP | 1646131 A1 | 12/2006 |
| EP | 2045897 A2 | 8/2009 |

OTHER PUBLICATIONS

Search Report issued Sep. 13, 2010 in French Patent Application FR 09/58732.

* cited by examiner

*Primary Examiner* — Tran Nguyen
*Assistant Examiner* — Leda Pham
(74) *Attorney, Agent, or Firm* — Vedder Price PC

(57) ABSTRACT

An alternator including a rotatably-assembled permanent magnet, the magnetization direction of the magnet being orthogonal to the rotation axis, and a winding with no iron core surrounding the magnet and having each turn in a plane substantially parallel to a plane containing the rotation axis, the winding extending across a dihedral angle from the rotation axis smaller than 75 degrees and, radially, over a distance ranging between one quarter and half of the magnet diameter.

6 Claims, 3 Drawing Sheets

ALTERNATOR AND CORRESPONDING ELECTRIC SYSTEM

BACKGROUND OF THE INVENTION

1. Field of the Invention

The present invention relates to a low-power alternator, that is, an alternator having a power ranging between 0.1 and 100 watts, typically from 1 to 3 watts. Such alternators are especially used for the bicycle lights or in flashlights recharged by means of a crank.

2. Discussion of Prior Art

Alternators, that is, electric generators providing a D.C. voltage, are here considered. Alternators comprising a rotor formed of a permanent magnet and a stator formed of a winding are more specifically considered. Conventionally, when such an alternator is desired to be formed, it is provided, to optimize the concentration and the use of the magnetic field generated by the rotor, to associate the stator windings with soft iron magnetic cores.

Because of the provision of magnetic cores at the stator, the alternators have a significant no-load running torque and a non-negligible weight. Thus, alternators used for bicycles, improperly called "dynamos", generally have very poor efficiencies. For example, a conventional "dynamo", provided to rotate at 3,750 rpm for a bicycle speed of 15 km/h and capable of providing a useful electric power on the order of 3 watts has losses on the order of 6 watts. When the alternator is not connected, the losses are on the order of 7 watts. The mechanical power to be provided thus ranges between 7 and 9 watts. The losses are far from being negligible with respect to the total effort provided by a cyclist pedaling at a normal pace. Indeed, it can be considered that with a bicycle of good quality, a cyclist pedaling at a normal pace to have a 15-km/h speed on flat ground must provide an effort on the order of 70 watts. When the alternator is used, in full load or no-load mode, the cyclist must provide an effort greater by 10% than his normal effort. As a result, the cyclist has to place his alternator in a non-operating position when he does not need it, which requires providing mechanical parts intended for the actuation or not of the alternator, which for example comprises a roller rolling on a wheel of the bicycle. To avoid this additional effort, the cyclist may delay his use of the lighting of his bicycle while the night is falling and thus jeopardize his security.

SUMMARY OF THE INVENTION

An object of an embodiment of the present invention is to provide an alternator overcoming at least some of the disadvantages of conventional alternators.

A more specific object of an embodiment of the present invention is to provide a high-efficiency alternator.

Another object of an embodiment of the present invention is to provide an alternator having negligible no-load losses.

Another object of an embodiment of the present invention is to provide an alternator of small weight, of low bulk, and formed of a small number of simple parts.

Thus, an embodiment of the present invention provides an alternator comprising a rotatably-assembled permanent magnet, the magnetization direction of the magnet being orthogonal to the rotation axis, and a winding with no iron core surrounding the magnet and having each turn in a plane substantially parallel to a plane containing the rotation axis, the winding extending across a dihedral angle from the rotation axis smaller than 75 degrees and, radially, over a distance ranging between one quarter and half of the magnet diameter.

According to an embodiment of the present invention, the alternator comprises several sets of coils angularly shifted with respect to one another to provide a polyphase power supply.

According to an embodiment of the present invention, the alternator comprises three sets of coils arranged at a 60-degree angle away from one another to provide a three-phase power supply.

According to an embodiment of the present invention, the magnet is cylindrical.

An embodiment of the present invention provides an electric regulation system comprising an alternator such as hereabove connected to a lighting device.

The foregoing and other objects, features, and advantages of the present invention will be discussed in detail in the following non-limiting description of specific embodiments in connection with the accompanying drawings.

DETAILED DESCRIPTION

Figure 1:
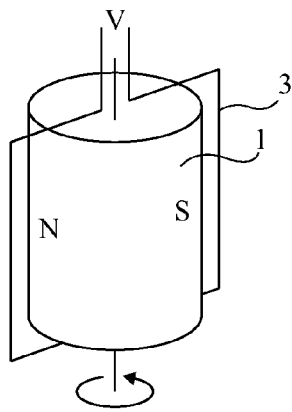
FIG. 1 is a perspective view illustrating an alternator configuration.

For clarity, the same elements have been designated with the same reference numerals in the different drawings, which have been drawn out of scale.

The present invention provides, to obtain a particularly lightweight alternator, to form an alternator with no iron core associated with the stator windings.

Alternators and generally generators with no iron core are a priori considered as having poor efficiencies. Indeed, the purpose of iron cores is to properly channel the field generated by the rotor and use it as much as possible in the stator windings.

As indicated previously, in real low-power machines (with a power lower than 10 watts), efficiencies are poor, i.e. seldom greater than 60% and sometimes smaller than 50%. Indeed, if two identical machines are compared at different scales, the resistance of the windings of the largest machine is lower while the voltage per spiral is greater. Copper losses are thus lower. Further, the reluctance of the magnetic circuit (the aptitude of the magnetic circuit to prevent its penetration by a magnetic field) of the largest machine is lower and the field system thus requires a smaller number of ampere-turns for a given magnetic field intensity (generally around 1 Tesla). Thus, even if the rotation speed of smaller machines is generally higher, the circumferential speed, and thus the generated voltage, remains lower.

FIG. 1 is a simplified view of an alternator having no iron core. Rotor 1 is formed of a cylindrical magnet having its north-south magnetization direction transverse to the direction of the rotation axis. This rotor rotates within a stator winding 3 formed of a small number of spirals, for example, a single spiral. Such an alternator actually is a laboratory device with a very poor efficiency and no practical applications, which used to be considered as basically unable to have a high efficiency. Demonstration devices comprising a large number of spirals have at the most been constructed, without obtaining a satisfactory efficiency.

It will here be demonstrated that, under certain conditions, alternators based on this principle may have a high efficiency while providing the advantage of a light weight. It will also be shown that they have the advantage of having very low no-load losses.

Figure 2:
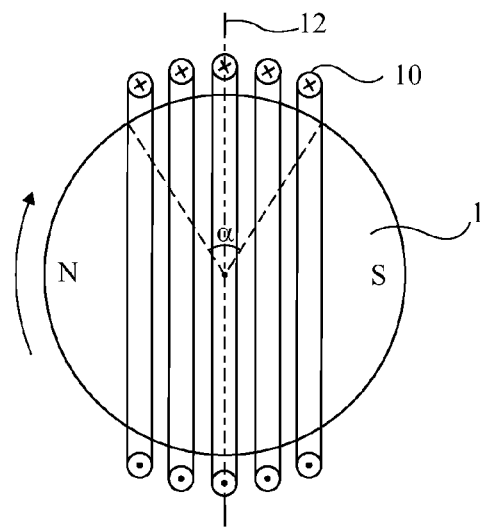
FIG. 2 is a top view schematically illustrating an alternator configuration according to an embodiment of the invention.

FIG. 2 is a transverse cross-section view of a structure of the type in FIG. 1 where a winding 10 comprises a number of spirals arranged side by side, electrically in series. It can be demonstrated that dihedral angle α defined as the angle from the center of the rotor towards the edges of winding 10 must be optimized. Indeed, if this angle is too large, the lateral spirals most distant from an axis 12 dividing angle α by two see a very low useful field component and do not contribute much to the voltage provision. However, such lateral spirals, which are in series with the others, add to the total coil resistance and increase copper losses, thus generating an efficiency drop. Measurements and simulations performed by the present inventor shown that angle α must be selected at a value close to 60°, for example, between 45° and 75°, for an optimum compromise between the internal resistance and the generated voltage. As compared with the central spiral, a spiral positioned at 45° contributes by 90% to the generated voltage, and a spiral positioned at 75° only contributes by 90% to the provided voltage. For larger angles, the contribution of the spirals decreases rapidly.

Figure 3:
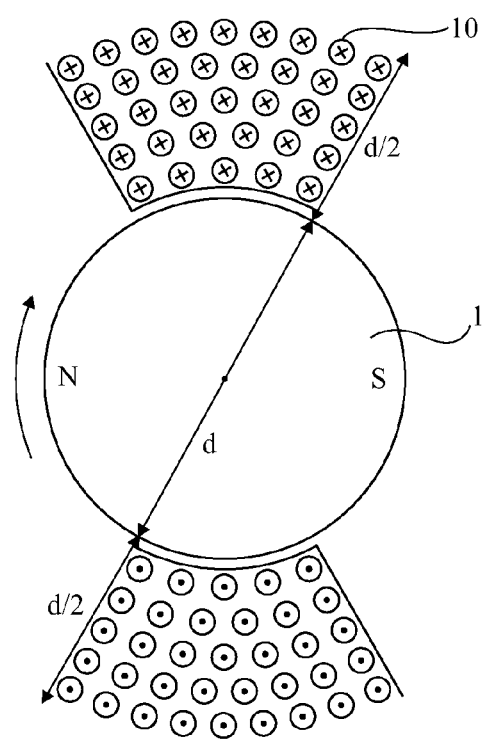
FIG. 3 is a top view schematically illustrating an alternator configuration according to an embodiment of the invention.

Further, as illustrated in FIG. 3, it is desirable for the winding to extend over a given radial distance in order to benefit as much as possible from the rotating field generated by the rotor, despite the absence of field concentration iron cores. Measurements and simulations performed by the present inventor show that the right compromise between the value of the series resistance of the winding and the collection of a maximum voltage, that is, a maximum use of the generated field, corresponds to a radial extension of the winding approximately ranging from one quarter to half of diameter d of the rotating magnet. The field measured 1 mm away from the surface of a cylindrical magnet having a 18-mm diameter is 0.54 T in front of the poles. At one quarter of its diameter, it is 0.25 T and only 0.11 T at half the diameter.

In the foregoing, a dipolar magnet, that is, a magnet having a single north pole and a single south pole, has been considered. Indeed, the present inventor has shown that the field line distribution in the field of a quadrupole magnet or another multipole magnet makes the collection of the generated field lines with no iron core much less satisfactory than with a dipolar magnet. This is contrary to the choice generally made in iron core generators for which, generally, the choice of a multipole field system (magnet, for example) helps increasing the efficiency.

However, to take the best advantage of the field radiated by the rotating magnet, given that the previously-described coil has a limited optimal angular extension, several sets of similar coils angularly shifted with respect to one another to form a polyphase alternator will preferably be used. The optimum solution is to place three sets of coils, as will described in further detail hereafter, to generate a three-phase current, each set of coils having an angular extension on the order of 60 degrees. It should be noted that it is very unusual to use three-phase assemblies for low-power alternators, three-phase assemblies being usually reserved for generators of a power greater than 1 kW.

Figure 4:
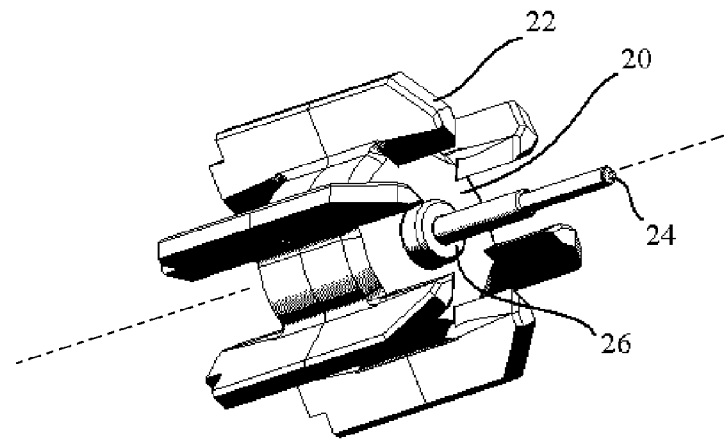
FIG. 4 is a perspective view illustrating an embodiment of an alternator according to an embodiment of the present invention, without its coils.
Figure 5:
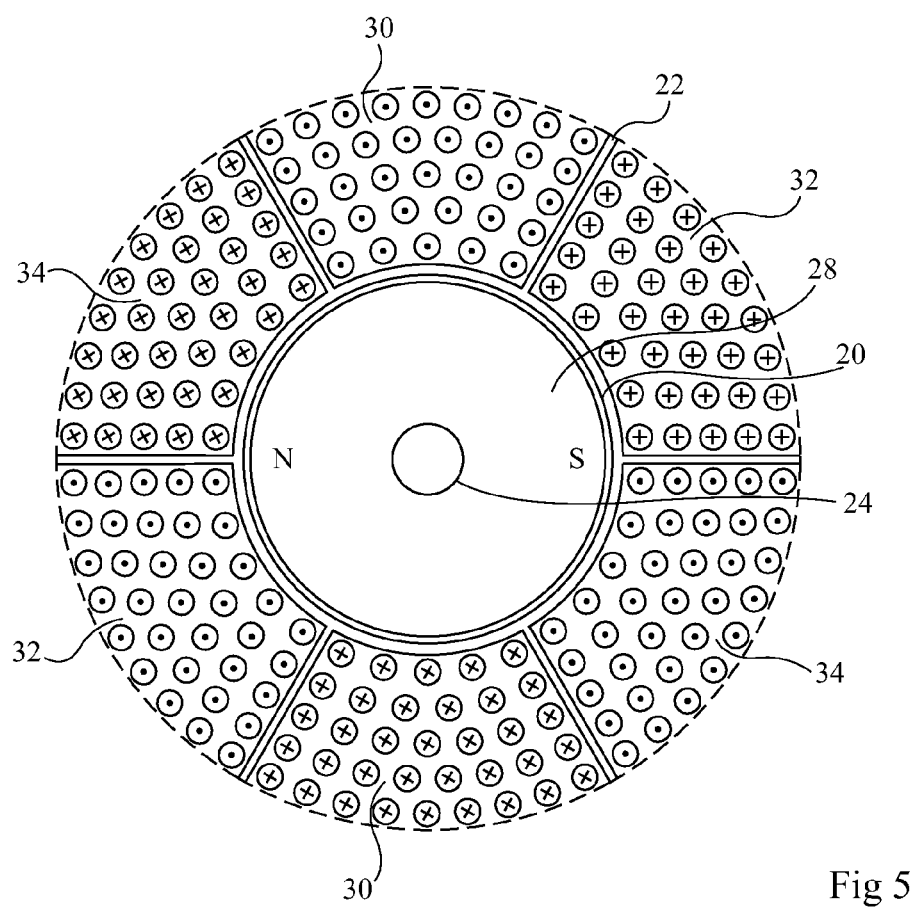
FIG. 5 is a cross-section view along a transverse plane of the alternator of FIG. 4.
Figure 6:
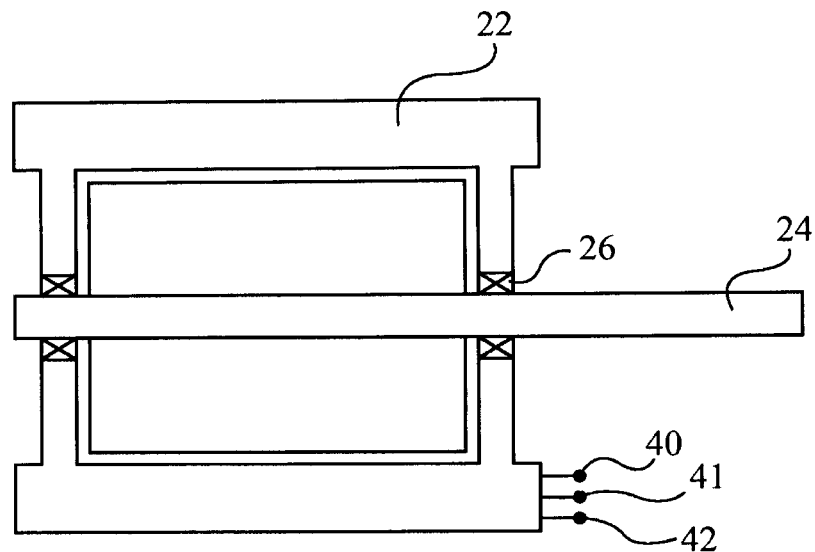
FIG. 6 is a cross-section view along an axial plane of the alternator of FIG. 4.

FIGS. 4, 5, and 6 illustrate a possible embodiment of an alternator according to an embodiment of the present invention.

FIG. 4 is a perspective view of such an alternator without its stator windings. FIG. 4 shows a housing 20 intended to receive stator windings. Fins 22 are provided to divide the space around this stator housing into six regions. A magnet, not shown in FIG. 4, is firmly attached to an axis 24 rotating in housing 20 due to the provision of bearings 26.

FIG. 5 is a cross-section view along a plane transverse to axis 24 which shows magnet 28 attached to axis 24. Fins 22 of housing 20 have also been shown. Three windings 30, 32, 34 are wound as described in relation with FIGS. 1 to 3 to provide a three-phase alternator. Each winding is wound between pairs of fins defining spatially opposite regions.

In the axial cross-section view of FIG. 6, the same reference numerals as in FIGS. 4 and 5 designate the same elements. Bearing 26 is better shown in this drawing, which also shows connections 40, 41, 42 across which the three-phase electric power is available.

Trials performed by the applicant have shown that such an alternator having a 36-millimeter overall diameter and a 60-g weight, rotating at 3,750 rpm, has no-load losses of 40 milliwatts only for a no-load voltage of 10.8 volts rms. This alternator can provide a power of 1 watt with a 90% efficiency and a nominal power of 3 watts with a 75% efficiency. Such three-phase A.C. current powers have been obtained due to 3 windings having 300 spirals each of enamel insulated wire having a 0.17-mm diameter.

The very low no-load loss value is a significant advantage of the device of the present invention. Indeed, given the low value of these losses, the alternator according to the present invention may be permanently left coupled and the mechanical disconnection means which had to be provided with conventional bicycle alternators are thus spared. On the other hand, the alternator may be almost permanently operated at its 1-W power (which is negligible with respect to the effort to be provided by the cyclist to maintain his speed on flat ground) with an efficiency on the order of 90%, so that the available power can be used to permanently recharge a battery that may be used, for example, when the bicycle is stopped or runs at very low speed. The maximum power will only be used when the cyclist desires to use his lighting or other electric equipment.

Of course, the alternator operates a variable frequency and voltage, which may be disturbing for the power supply of a light. If the lighting intensity is desired to be relatively constant, electronic regulation means will be provided.

Figure 7:
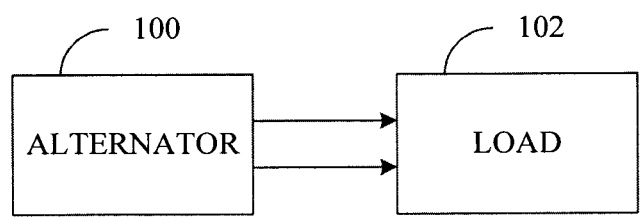
FIG. 7 is a block diagram schematically illustrating an alternator according to an embodiment of the invention connected to a load.

FIG. 7 illustrates an alternator 100, as described above, electrically connected to a load 102. As described above, the load 102 may comprise, for example, a lighting devise or a battery. Techniques for connecting an alternator 100 as described herein to the load 100 are well known in the art.

Although an alternator has been described in the specific case of the application to a bicycle light, this alternator may be used in other applications, for example, in relation with non-motor land vehicles such as rollers, strollers, wheelchairs, or with non-land vehicles such as gliders, paragliders, or sailboats, by driving the alternator axis with a propeller or a turbine. It may also be used as a security lighting for a luggage trailer or in the context of electronic toys: the transformation of mechanical power into electric power by this type of high-performance lightweight alternator would enable to suppress the batteries of certain toys such as friction motor cars. The power supply of electronic circuits of thermal model toys, of drones, or of heat-engine garden tools, a use as a small high-efficiency windmill, a use for mechanically actuated flashlights, a use as a spare charger for a cell phone or other mobile devices can also be mentioned.

Further, the magnet has been described as being a cylindrical magnet. Any other magnet shape would also be possible, for example, a spherical magnet or a bar magnet. However, for reasons of efficiency and of mechanical simplicity, a cylindrical magnet will be preferred.

Further, given the absence of iron cores, there will remain a rotating magnetic field outside of the alternator coils. In certain applications, an external shield may be provided to shield this field. It may also be provided for this external shield to rotate along with the magnet.

Of course, the present invention is likely to have various alterations, modifications, and improvements which will readily occur to those skilled in the art. Such alterations, modifications, and improvements are intended to be part of this disclosure, and are intended to be within the spirit and the scope of the present invention. Accordingly, the foregoing description is by way of example only and is not intended to be limiting. The present invention is limited only as defined in the following claims and the equivalents thereto.

The invention claimed is:

1. An alternator comprising:
a rotatably-assembled permanent magnet, the magnetization direction of the magnet being orthogonal to the rotation axis, and
a winding with no iron core surrounding the magnet and having each turn in a plane substantially parallel to a plane containing the rotation axis, the winding extending across a dihedral angle from the rotation axis smaller than 75 degrees and, radially, over a distance ranging between one quarter and half of the magnet diameter from a circumference of the magnet.

2. The alternator of claim 1, comprising several sets of coils angularly shifted with respect to one another to provide a polyphase power supply.

3. The alternator of claim 1, comprising three sets of coils arranged at a 60-degree angle away from one another to provide a three-phase power supply.

4. The alternator of claim 1, wherein the magnet is cylindrical.

5. An electric regulation system comprising the alternator of claim 1, connected to a lighting device.

6. An electric regulation system comprising the alternator of claim 1, connected to a battery.

* * * * *